UNITED STATES PATENT OFFICE.

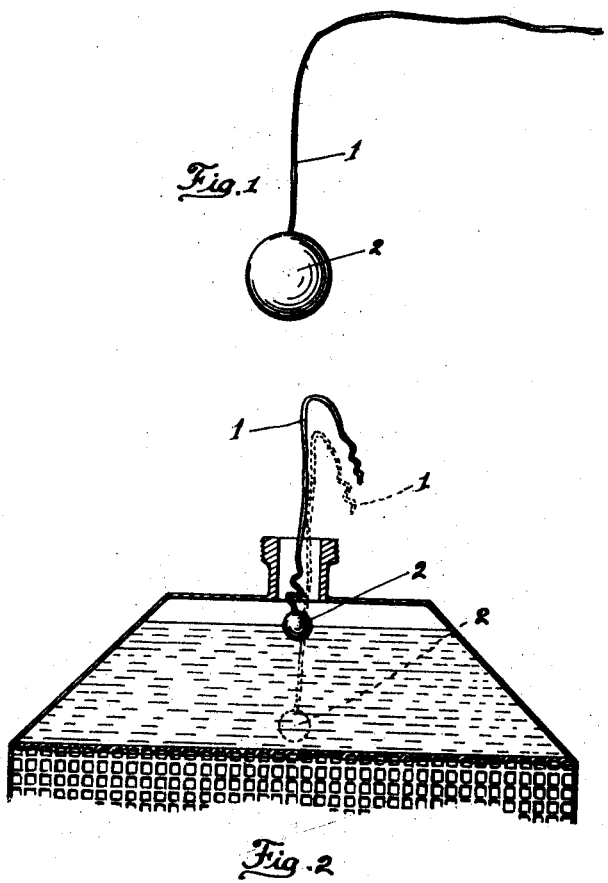

THOMAS MIDGLEY, JR., OF LANCASTER, OHIO, ASSIGNOR, BY MESNE ASSIGNMENTS, TO GENERAL MOTORS CORPORATION, A CORPORATION OF DELAWARE.

HYDROMETER.

1,335,253.  Specification of Letters Patent.  Patented Mar. 30, 1920.

Application filed January 10, 1916. Serial No. 71,172.

*To all whom it may concern:*

Be it known that I, THOMAS MIDGLEY, Jr., a citizen of the United States, residing at Lancaster, in the county of Fairfield and State of Ohio, have invented certain new and useful Improvements in Hydrometers, of which the following is a specification.

My invention relates to hydrometers and has among its objects more particularly to provide a hydrometer which will serve as a standard whereby to test certain liquids and thereby determine whether said liquids are up to the standard of specific gravity set by the hydrometer.

In the particular use to which I have put my present invention, I make the hydrometer in the shape of a ball, attached to a string, serviceable for testing the specific gravity of the water and alcohol mixture utilized in the radiators of automobiles. But it will of course be understood that the invention is not limited to any such particular use, since a hydrometer of this character might be utilized for testing or standardizing a variety of other liquids.

Figure 1 shows my improved type of hydrometer with the ball-shaped gage member and the string attached thereto.

Fig. 2 shows a cross section of an automobile radiator, with the manner of immersing the hydrometer ball in the cooling mixture of water and alcohol.

It will, of course, be understood that during the colder months of the year, there is danger of the water freezing in the automobile radiator, and for this reason a mixture of alcohol and water is utilized. A particularly serviceable mixture is approximately 20% solution alcohol with water. However, since the alcohol will evaporate more quickly than the water, more alcohol should be added from time to time in order to preserve the proper proportions.

By the use of my present hydrometer, the operator may instantly tell whether the proper proportion of alcohol and water is present, by simply dropping the hydrometer ball into the radiator liquid. As shown in Fig. 1, the hydrometer gage member 2 has fastened to it a cord or other flexible handle 1. And in Fig. 2 the hydrometer is shown dropped into the radiator chamber, the cap of the radiator having been removed for this purpose.

Having determined that the desired mixture of alcohol and water is say 20% alcohol, it is known that such mixture has a definite specific gravity at a given temperature. It is therefore the purpose of my invention to provide my hydrometer gage member so that it will have a specific gravity substantially the same as this desired standard of the liquid to be tested. I therefore select for my gage member a mixture of two substances, one being rubber which is of less specific gravity than the desired standard of the radiator liquid, and the other substance zinc oxid which is of greater specific gravity than the desired standard of said liquid.

This zinc oxid is in the nature of a filler, that is, it is inert to the rubber so as not to cause any chemical change to be undergone by the rubber. At the same time, both the rubber and the zinc oxid are inert with reference to the alcohol and water mixture comprising the liquid to be tested. But the proportions of rubber and zinc oxid are such that their resultant specific gravity is the same as that of the desired standard of the liquid to be tested, that is, the specific gravity of a mixture of 20% alcohol with water.

With a hydrometer of this character, it is apparent that the gage member itself has no glass or breakable parts, and it constitutes a solid homogeneous member which can be carried around by the motorist for testing his radiator mixture.

It will naturally be appreciated, however, that the invention may be applied for constructing a hydrometer to test or standardize any other liquid, whose constituents are to be varied to bring the liquid up to any desired standard of specific gravity. In such case, the hydrometer would be constructed by selecting as one of the substances thereof, a substance having less specific gravity than the desired standard of the liquid, and this would be mixed with the other substance of greater specific gravity than the liquid, but the resultant specific gravity being substantially that of the desired standard. The word "substantially" is used because it is of course to be understood that in the particular circumstances for which this hydrometer is to be utilized, absolute accuracy is not necessary, so that variations of the resultant specific gravity within reasonable limits is to be understood as coming within the scope of the invention.

At the same time the two substances chosen would have to be such as are inert to each other and inert to the liquid to be tested, so as not to cause any chemical change to take place in the hydrometer gage member, either by the reaction of the constituent substances on each other, or by the effect of dipping the gage member into the liquid to be tested.

From the foregoing, it will be seen that such a hydrometer serves as a standardizing instrument, so that if the hydrometer immediately sinks in the liquid, (as shown in dotted lines in Fig. 2), it shows that the proportion of ingredients of the liquid have to be changed to make the liquid heavier.

Whereas, if the hydrometer gage member floats on the surface of the liquid, then the ingredients of the liquid have to be changed to make the liquid lighter. As soon as the proportions of the ingredients of the liquid are so modified as to reach the correct amounts, (for example, in the radiator mixture, 20% alcohol with water), then the specific gravity of the liquid mixture would be standardized to the desired point, and this would be shown by the fact that the hydrometer action is about neutral between floating and sinking condition. In this way the specific gravity of the liquid is standardized up to that of the hydrometer gage member, and in this respect the hydrometer can be called a standardizing hydrometer. That is, the hydrometer is not intended to give a numerical measurement of the specific gravity of a variety of liquids, but it is for the purpose of serving as a standard of specific gravity to which the specific gravity of a liquid mixture may be brought by varying the proportions of heavier and lighter components of the liquid mixture.

Another feature of my invention relates to the coefficient of expansion of the liquid and of the hydrometer gage member. For example, in automobile use, the radiator liquid (alcohol and water) will sometimes be of low temperature, say 30° F. or below, while at other times of high temperature, due to the continued running of the engine. This means a change in the specific gravity of the liquid.

Now if the specific gravity of the hydrometer ball is determined upon as for the lower temperature, then at the higher temperature, its specific gravity would likewise be changed. Therefore an error would result unless the change were the same both for the liquid and for the ball.

I avoid this difficulty by compounding the gage member so that it will have approximately the same coefficient of expansion as that of the liquid with which it is designed to be used, (in the specific instance, the same coefficient of expansion as that of 20% alcohol with water). Thereby the result is, that no matter what is the temperature of the liquid at the time of the test, the ball when immersed comes to the same temperature; and since the coefficients of expansion are the same, the temperature changes in specific gravity would be the same for ball and liquid, therefore the standardizing test is unaffected.

In the particular hydrometer which I have described, composed of rubber and zinc oxid, by proper compounding of the rubber with the zinc oxid, this result is accomplished. It is well known that in the compounding of rubber from the crude state by the addition of sulfur, any desired coefficient of expansion may be secured. So that in actual practice, the most convenient method is to use a cut-and-try process of compounding the rubber with the sulfur, and at the same time mix the zinc oxid in with the rubber and sulfur until a mixture is secured which gives a coefficient of expansion substantially the same as that of the liquid to be tested.

What I claim is as follows:

1. A standardizing hydrometer for standardizing the specific gravity of a liquid, having a gage member compounded of different substances so as to have a resulting specific gravity equal to the desired specific gravity standard of the liquid to be tested, and likewise to have the same coefficient of expansion as that of the liquid to be tested.

2. A standardizing hydrometer for standardizing the specific gravity of a liquid, and having a gage member composed of a mixture of rubber whose specific gravity is less than the desired standard of said liquid but whose coefficient of expansion is substantially equal to that of the liquid to be tested, said rubber being mixed with a filler of greater specific gravity than said standard, said filler being inert both to the rubber and to said liquid, and the resultant specific gravity of the gage member being that of the desired standard of the liquid to be tested.

3. A standardizing hydrometer for standardizing the specific gravity of a liquid, having a gage member compounded of rubber and zinc oxid, said rubber and zinc oxid being compounded to have a coefficient of expansion and a resultant specific gravity substantially equal to the desired coefficient of expansion and specific gravity of the liquid to be tested.

4. A hydrometer comprising a flexible member, and a gage member connected to the flexible member and compounded of rubber and zinc oxid in such proportions that the member will sink in a solution of alcohol in water which will not freeze at ordinary winter temperatures.

5. A hydrometer comprising a flexible member, and a gage member connected to the flexible member and compounded of rubber and zinc oxid in such proportions that the member will have approximately the same coefficient of expansion as a 20% solution of alcohol and water.

In testimony whereof I affix my signature in presence of two witnesses.

THOMAS MIDGLEY, Jr.

Witnesses:
 WALTER E. L. BOCK,
 A. L. PHELPS.